United States Patent
Juni

(10) Patent No.: US 8,135,246 B2
(45) Date of Patent: Mar. 13, 2012

(54) THREE-DIMENSIONAL SENSOR OPTICAL WAVEGUIDE, AND THREE-DIMENSIONAL SENSOR EMPLOYING THE SAME

(75) Inventor: Noriyuki Juni, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 329 days.

(21) Appl. No.: 12/500,126

(22) Filed: Jul. 9, 2009

(65) Prior Publication Data

US 2010/0027937 A1 Feb. 4, 2010

Related U.S. Application Data

(60) Provisional application No. 61/091,824, filed on Aug. 26, 2008.

(30) Foreign Application Priority Data

Jul. 29, 2008 (JP) ................................. 2008-195145

(51) Int. Cl.
G02B 6/00 (2006.01)
G02B 6/32 (2006.01)

(52) U.S. Cl. ............... 385/12; 385/14; 385/33; 385/131

(58) Field of Classification Search .............. 385/12–14, 385/33, 129–132

See application file for complete search history.

(56) References Cited

U.S. PATENT DOCUMENTS

| 3,727,069 A | 4/1973 | Crittenden, Jr. et al. | |
| 4,384,201 A | 5/1983 | Carroll et al. | |
| 5,988,645 A * | 11/1999 | Downing | 273/348 |
| 7,826,699 B2 * | 11/2010 | Juni | 385/33 |
| 7,873,247 B2 * | 1/2011 | Shimizu et al. | 385/33 |
| 2005/0175306 A1 * | 8/2005 | Chong et al. | 385/129 |
| 2005/0201681 A1 * | 9/2005 | Payne | 385/33 |
| 2005/0271326 A1 * | 12/2005 | Luo | 385/43 |
| 2006/0002655 A1 * | 1/2006 | Smits | 385/31 |
| 2007/0189700 A1 | 8/2007 | Eriyama et al. | |
| 2008/0074402 A1 * | 3/2008 | Cornish et al. | 345/176 |
| 2008/0106527 A1 * | 5/2008 | Cornish et al. | 345/176 |

FOREIGN PATENT DOCUMENTS

JP 2007-163429 A 6/2007

OTHER PUBLICATIONS

European Search Report dated Dec. 8, 2009, issued in corresponding European Patent Application No. 09165413.7.

* cited by examiner

*Primary Examiner* — Daniel Petkovsek
(74) *Attorney, Agent, or Firm* — Westerman, Hattori, Daniels & Adrian, LLP

(57) ABSTRACT

A three-dimensional sensor optical waveguide which permits size reduction, and a three-dimensional sensor employing the same. A three-dimensional sensor optical waveguide includes a plurality of frame-shaped optical waveguide members stacked coaxially in a thickness direction, and a measurement space defined by inner spaces of the stacked frame-shaped optical waveguide members. The optical waveguide members each include a light emitting core, a light receiving core and an over-cladding layer covering the cores. The light emitting core has a light output end positioned in one of opposed inner edge portions of each of the frame-shaped optical waveguide members. The light receiving core has a light input end positioned in the other inner edge portion of each of the frame-shaped optical waveguide members.

5 Claims, 8 Drawing Sheets

THREE-DIMENSIONAL SENSOR OPTICAL WAVEGUIDE, AND THREE-DIMENSIONAL SENSOR EMPLOYING THE SAME

RELATED APPLICATIONS

This application claims the benefit of U.S. Provisional Application No. 61/091,824, filed Aug. 26, 2008, which is hereby incorporated by reference.

BACKGROUND OF THE INVENTION

1. Field of the Invention

The present invention relates to a three-dimensional sensor optical waveguide and a three-dimensional sensor employing the same.

2. Description of the Related Art

Three-dimensional sensors are typically adapted to emit optical or electric radiation toward an object to be detected, receive optical or electric radiation reflected on the object and provide information such as the three-dimensional configuration, the position and the speed of the object through computational processing by means of a computer or the like (see, for example, Japanese Patent Application Laid-Open No. 2007-163429).

The prior-art three-dimensional sensors described above are bulky apparatuses. Therefore, it is impractical to mount such a prior-art three-dimensional sensor as finger touch position detecting means on a touch panel to be used for a banking ATM, a station's ticket vendor, a portable game player or the like, because the three-dimensional sensor is likely to have a greater size than a main body of the touch panel.

A three-dimensional sensor employing an optical waveguide as in the present invention is not conventionally known.

DISCLOSURE OF THE INVENTION

In view of the foregoing, it is an object of the present invention to provide a three-dimensional sensor optical waveguide which permits size reduction, and to provide a three-dimensional sensor employing the optical waveguide.

According to a first inventive aspect of the present invention to achieve the aforementioned object, there is provided a three-dimensional sensor optical waveguide, which includes: a plurality of frame-shaped optical waveguide members stacked coaxially in a thickness direction; and a measurement space defined by inner spaces of the stacked frame-shaped optical waveguide members; the optical waveguide members each including a light emitting core, a light receiving core and an over-cladding layer covering the cores; the light emitting core having a light output end positioned in one of opposed inner edge portions of each of the frame-shaped optical waveguide members, and a light input end positioned on an outer edge of each of the frame-shaped optical waveguide members; the light receiving core having a light input end positioned in the other inner edge portion of each of the frame-shaped optical waveguide members, and a light output end positioned on another outer edge of each of the frame-shaped optical waveguide members.

According to a second inventive aspect, there is provided a three-dimensional sensor, which includes: the aforementioned three-dimensional sensor optical waveguide; control means; a light emitting element provided in association with the light input end of the light emitting core on an outer side of the frame-shaped optical waveguide members for emitting light into the light emitting core; and a light receiving element provided in association with the light output end of the light receiving core on the outer side of the frame-shaped optical waveguide members for receiving light from the light receiving core; the control means being electrically connected to the light emitting element and the light receiving element, and configured to control light emission from the light emitting element and process a signal received from the light receiving element through computation.

In the inventive three-dimensional sensor optical waveguide, the plurality of frame-shaped optical waveguide members are stacked coaxially in the thickness direction, and the measurement space in which an objected to be detected is placed or moved is defined by the inner spaces of the stacked frame-shaped members (hollow spaces respectively surrounded by the frame-shaped members and continuous in a stacking direction). The inventive three-dimensional sensor employing the three-dimensional sensor optical waveguide includes the light emitting element and the light receiving element provided on the outer side of the frame-shaped optical waveguide members and electrically connected to the control means. In the three-dimensional sensor, the frame-shaped optical waveguide members can each have a smaller thickness and a smaller size, and the light emitting element, the light receiving element and the control means can also each have a smaller thickness and a smaller size. Therefore, the inventive three-dimensional sensor including these components can have a reduced size. In the hollow spaces surrounded by the frame-shaped optical waveguide members of the inventive three-dimensional sensor, light emitted from the light emitting element based on a light emitting signal from the control means is outputted from the light output end of the light emitting core, and inputted into the light input end of the light receiving core. If the object to be detected is placed or moved in the measurement space of the three-dimensional sensor optical waveguide, the outputted light is partly blocked by the object. The blocking of the light is detected by the light receiving element, and a signal of the light receiving element is processed together with the light emitting signal applied to the light emitting element through computation by the control means, whereby information such as the three-dimensional position, the inclination, the speed and the size of the object in the measurement space can be provided.

In the present invention, the "frame-shaped" members are not necessarily continuous, but may be discontinuous with one part of each of the members being separated from the other part. Where the optical waveguide members each have a rectangular frame shape, for example, the optical waveguide members may each include two L-shaped optical waveguide portions disposed in opposed relation into a rectangular frame shape.

In the inventive three-dimensional sensor optical waveguide, the frame-shaped optical waveguide members each including the light output core end and the light input core end are stacked coaxially in the thickness direction, and the inner spaces of the stacked frame-shaped optical waveguide members define the measurement space in which the object to be detected is placed or moved. Since the optical waveguide members can each have a smaller thickness and a smaller size, the inventive three-dimensional sensor optical waveguide including the stacked optical waveguide members can have a reduced size. Therefore, the three-dimensional sensor employing the three-dimensional sensor optical waveguide can also have a reduced size.

In each of the optical waveguide members, particularly, the light emitting core may include a first lens portion provided at the light output end thereof and having a lens surface curved convexly outward into an arcuate plan shape, and the over-cladding layer may include a second lens portion provided on an edge portion thereof which covers the lens surface of the first lens portion and having a lens surface curved convexly outward into an arcuate shape as seen in side section. In this case, the first lens portion to be provided at the light output end of the light emitting core and the second lens portion to be provided on the edge portion of the over-cladding layer are self-aligned with each other in the formation of the over-cladding layer. This obviates the need for positioning the first lens portion and the second lens portion with respect to each other, thereby improving the productivity. In addition, the refractive functions of the first lens portion and the second lens portion suppress the divergence of the outputted light, thereby improving the accuracy of the information on the object to be detected.

In each of the optical waveguide members, particularly, the light receiving core may include a third lens portion provided at the light input end thereof and having a lens surface curved convexly outward into an arcuate plan shape, and the over-cladding layer may include a fourth lens portion provided on an edge portion thereof which covers the lens surface of the third lens portion and having a lens surface curved convexly outward into an arcuate shape as seen in side section. In this case, the third lens portion and the fourth lens portion, like the first lens portion and the second lens portion on the light emitting side, can be self-aligned with each other in the formation of the over-cladding layer, thereby improving the productivity. In addition, the refractive functions of the third lens portion and the fourth lens portion make it possible to properly converge the inputted light to introduce the light into the light receiving core, so that the accuracy of the information on the object is improved.

Where the stacked frame-shaped optical waveguide members are offset about a predetermined axis from each other, the light emitting cores of the respective frame-shaped optical waveguide members output the light in different light outputting directions due to the offset of the optical waveguide members. Therefore, a three-dimensional object can be detected at different angles at different heights. Thus, the approximate shape of the object can be detected. With the use of a single optical waveguide member, the contour of a part of the object irradiated with the light can be detected. If the frame-shaped optical waveguide members are not offset (the frame-shaped optical waveguide members are aligned), the light emitting cores of the respective optical waveguide members output the light in the same light outputting direction, so that only the contour of a part of the object irradiated with the light can be detected in a certain direction with respect to the object. This makes it impossible to detect the shape of a portion (shaded portion) of the object not irradiated with the light. Where the optical waveguide members are stacked in the offset state as in the present invention, on the contrary, the object to be detected is irradiated with the light in different directions at different heights. Therefore, the contours of parts of the object irradiated with the light in the different directions at different heights can be detected. Then, the approximate shape of the object is determined based on the contours of the parts of the object irradiated with the light in the different directions.

The inventive three-dimensional sensor includes the afore-mentioned three-dimensional sensor optical waveguide which permits size reduction, the light emitting element and the light receiving element provided on the outer side of the frame-shaped optical waveguide members, and the control means electrically connected to the light emitting element and the light receiving element. Therefore, the inventive three-dimensional sensor can have a reduced size. When the object to be detected is placed or moved in the measurement space of the three-dimensional sensor optical waveguide, information such as the three-dimensional position, the inclination, the speed and the size of the object in the measurement space can be provided.

DETAILED DESCRIPTION OF THE INVENTION

Embodiments of the present invention will hereinafter be described in detail with reference to the attached drawings.

Figure 1:
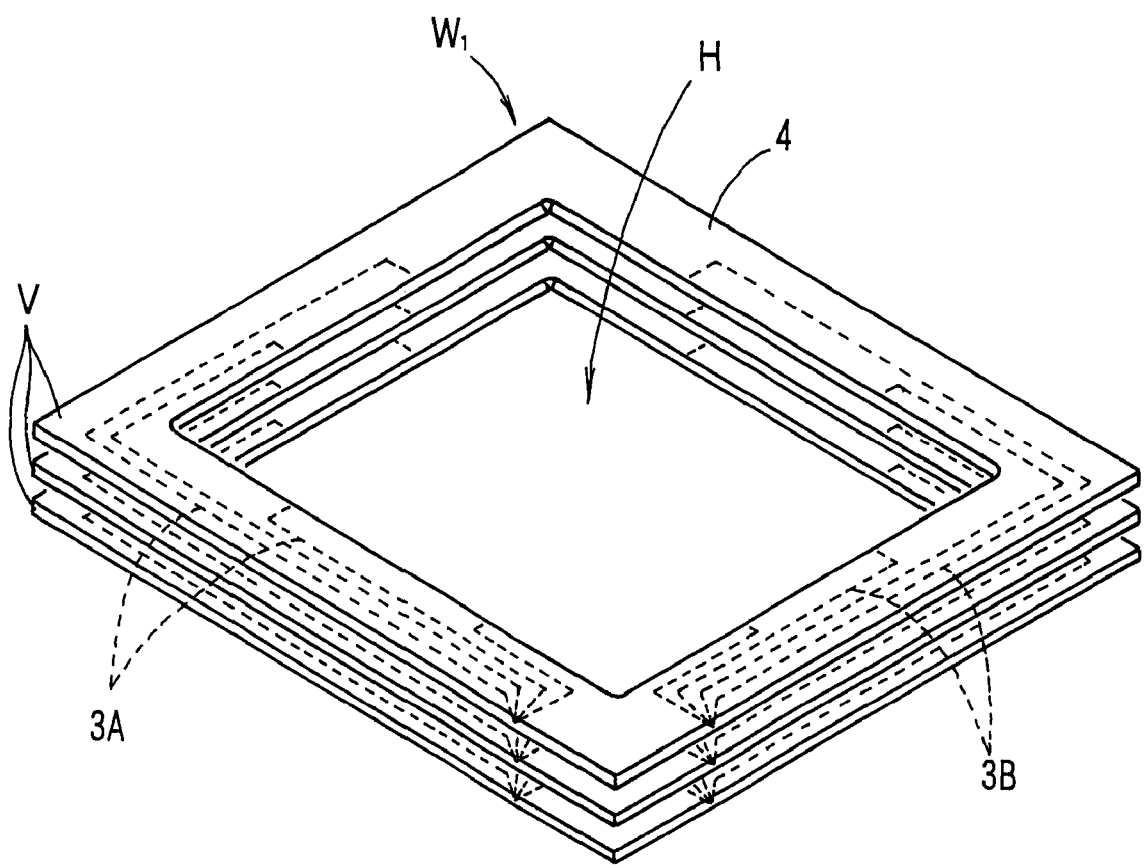
FIG. 1 is a perspective view schematically illustrating a three-dimensional sensor optical waveguide according to a first embodiment of the present invention.

FIG. 1 illustrates a three-dimensional sensor optical waveguide according to a first embodiment of the present invention. The three-dimensional sensor optical waveguide $W_1$ according to this embodiment includes a plurality of rectangular frame-shaped optical waveguide members V (three optical waveguide members each having a continuous rectangular frame shape in FIG. 1) stacked coaxially in a thickness direction in alignment. Continuous hollow spaces respectively defined by the frame-shaped optical waveguide members V collectively serve as a measurement space H in which an object to be detected is placed or moved. In practice, the stacked optical waveguide members are kept in contact with one another in this embodiment, but illustrated as being spaced from one another in FIG. 1 for easy understanding. In FIG. 1, reference characters 3A and 3B denote cores respectively denote light emitting cores and light receiving cores each serving as a light passage in the optical waveguide members V. In FIG. 1, the widths of broken lines indicate the widths of the cores 3A, 3B, and some of the cores 3A, 3B are omitted. A reference character 4 denotes an over-cladding layer which covers the cores 3A, 3B.

Figure 2A:
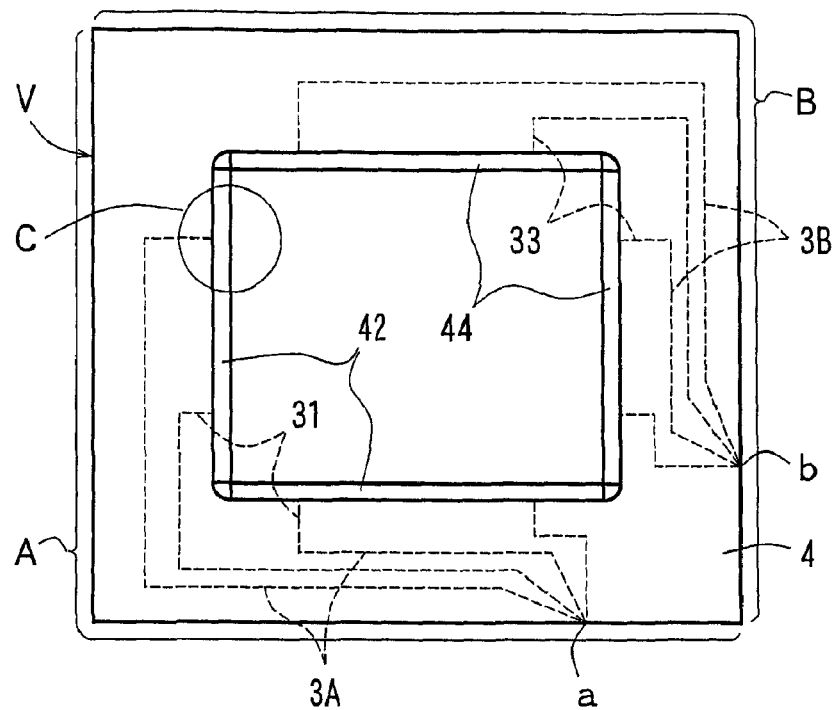
FIGS. 2A, 2B and 2C schematically illustrate an optical waveguide member of the three-dimensional sensor optical waveguide, FIG. 2A being a plan view, FIG. 2B being an enlarged plan view of an end portion of a core in a circle C in FIG. 2A, FIG. 2C being an X-X sectional view of FIG. 2B.

As shown in FIG. 2A (a plan view), the rectangular frame-shaped optical waveguide members V each include an L-shaped light emitting optical waveguide portion A, and an L-shaped light receiving optical waveguide portion B. The rectangular frame-shaped optical waveguides V each include a rectangular frame-shaped under-cladding layer (base) 2 (see FIG. 2C), light emitting cores 3A and light receiving cores 3B provided on a surface of the under-cladding layer 2, and an over-cladding layer 4 provided over the entire under-cladding layer 2 as covering the cores 3A, 3B. The cores 3A, 3B each serve as a light passage. The light emitting cores 3A and the light receiving cores 3B respectively extend from predetermined portions a and b on outer edges of the L-shaped portions to inner edges of the L-shaped portions in equidistant parallel relation. The light emitting cores 3A provided in the light emitting optical waveguide portion A are equal in number to the light receiving cores 3B provided in the light receiving optical waveguide portion B. Further, light output end faces of the light emitting cores 3A are opposed to light input end faces of the light receiving cores 3B. In FIG. 2A, the cores 3A, 3B are indicated by broken lines, and the thicknesses of the broken lines indicate the thicknesses of the cores 3A, 3B, and some of the cores 3A, 3B are omitted.

Figure 2B:
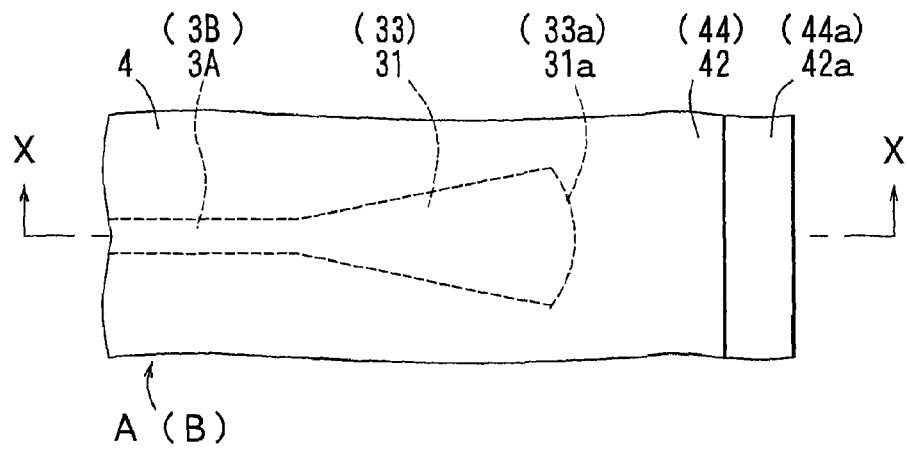
Figure 2C:
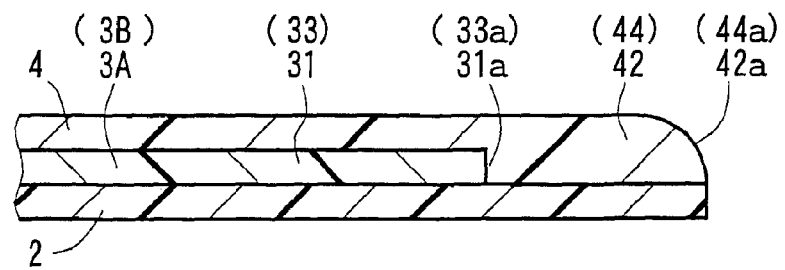

In this embodiment, as shown in FIG. 2B (an enlarged plan view of a circled portion C in FIG. 2A) and FIG. 2C (an X-X sectional view of FIG. 2B), the light emitting cores 3A each include a generally fan-shaped first lens portion 31 provided at the light output end thereof, and the light receiving cores 3B each include a generally fan-shaped third lens portion 33 (parenthesized in these figures) provided at the light input end thereof. As shown in FIG. 2A, the first lens portion 31 is opposed to the third lens portion 33. In FIGS. 2B and 2C, a portion around the first lens portion 31 and a portion around the third lens portion 33 are simultaneously shown, because these lens portions both have the same general fan shape. The first and third lens portions 31, 33 are each gradually flared toward the end (the right end in FIG. 2B) into the general fan shape, and respectively have lens surfaces 31a, 33a curved convexly outward into an arcuate shape as seen in plan. The cores 3A and 3B respectively including the first and third lens portions 31 and 33 each have a uniform thickness. Further, the over-cladding layer 4 is provided over a surface of the under-cladding layer 2 as having a uniform height and covering the entire cores 3A, 3B (including the first and third lens portions 31, 33). The over-cladding layer 4 has the same rectangular frame shape as the under-cladding layer 2. The rectangular frame-shaped over-cladding layer 4 includes a second lens portion 42 provided on an inner edge portion thereof on the light emitting side, and a fourth lens portion 44 provided on an inner edge portion thereof on the light receiving side. As shown in FIG. 2C, the second and fourth lens portions 42, 44 respectively have lens surfaces 42a, 44a each curved convexly outward into an arcuate shape as seen in side section.

Figure 3:
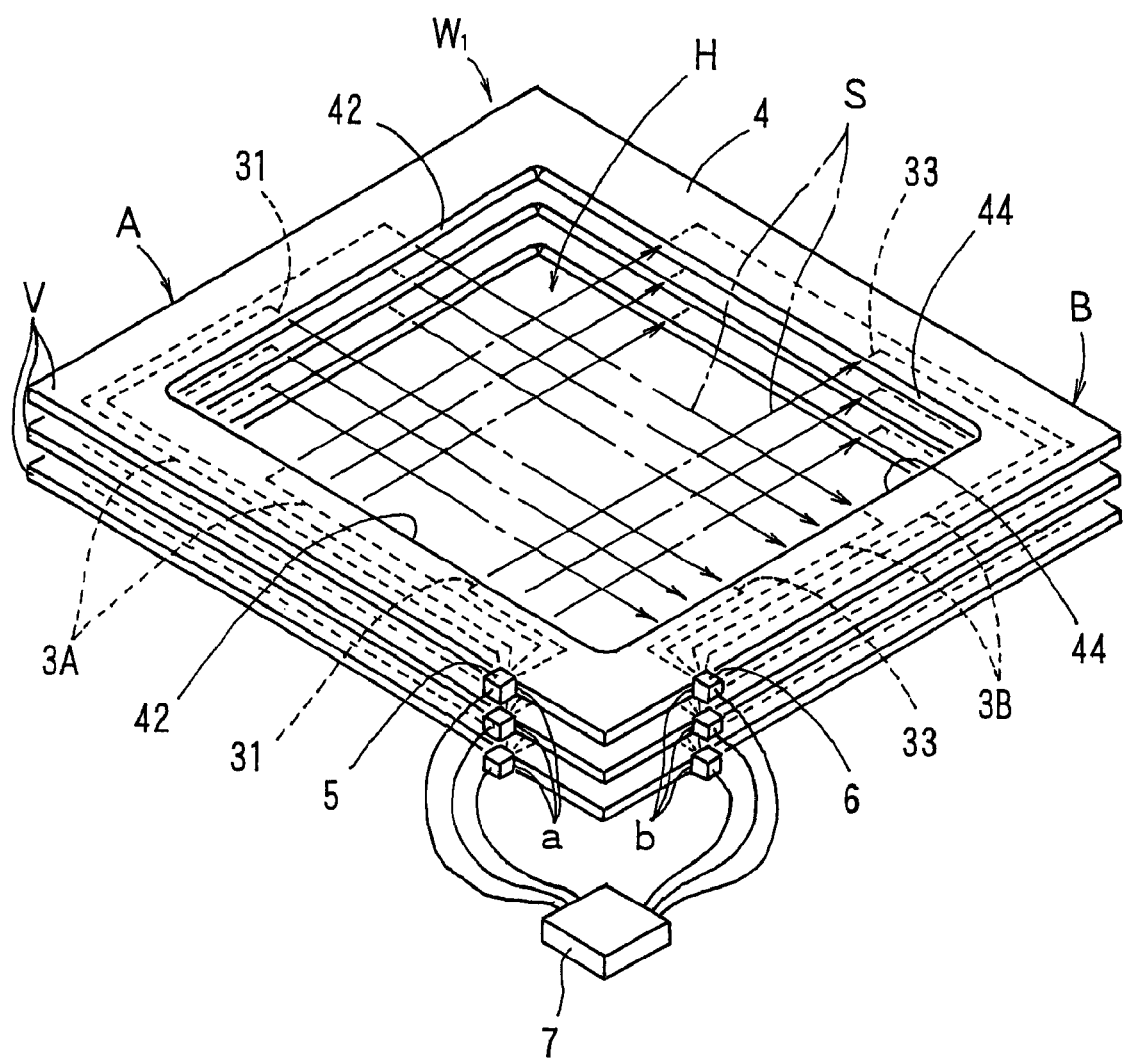
FIG. 3 is a perspective view schematically illustrating a three-dimensional sensor employing the three-dimensional sensor optical waveguide.

Next, a three-dimensional sensor employing the aforementioned three-dimensional sensor optical waveguide $W_1$ will be described. As shown in FIG. 3, the three-dimensional sensor includes light emitting elements 5 respectively connected to the predetermined portions a on the outer edges of the light emitting optical waveguide portions A of the optical waveguide members V, and light receiving elements 6 respectively connected to the predetermined portions b on the outer edges of the light receiving optical waveguide portions B of the optical waveguide members V. Further, the light emitting elements 5 and the light receiving elements 6 are electrically connected to control means 7 such as including an ADC (analog-digital converter) and a microprocessor. The control means controls light emission of the light emitting elements 5, and processes signals from the light receiving elements 6 through computation. In FIG. 3, the cores 3A, 3B are indicated by broken lines as in FIG. 2A. Further, the thicknesses of the broken lines indicate the thicknesses of the cores 3A, 3B, and some of the cores 3A, 3B are omitted. In FIG. 3, only some of multiple light beams S are shown for easy understanding.

Figure 4A:
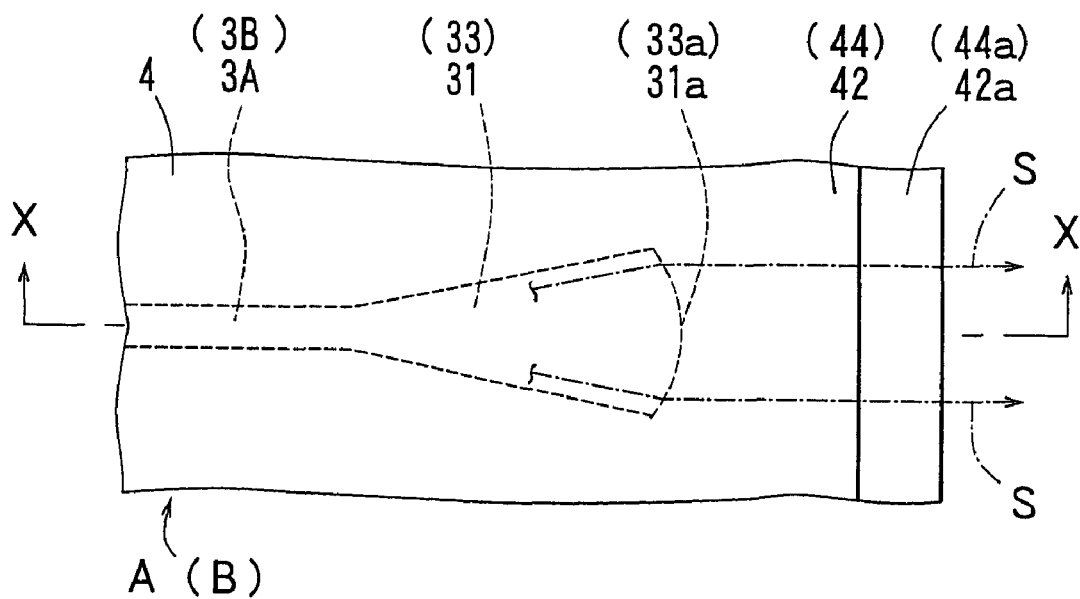
FIGS. 4A and 4B schematically illustrate a light emitting state of the optical waveguide member, FIG. 4A being a plan view, FIG. 4B being an X-X sectional view of FIG. 4A.

For detection of an object by the three-dimensional sensor, the control means 7 applies light emitting signals to the light emitting elements 5 to cause the light emitting elements 5 to emit light based on the signals. The light thus emitted from the light emitting elements 5 are transmitted from the predetermined portions a on the outer edges of the light emitting optical waveguide portions A to the light output ends of the cores 3A on the inner edges of the light emitting optical waveguide portions A through the light emitting cores 3A. Then, light beams S are outputted from the inner light output ends of the cores 3A as shown in FIG. 4A (a plan view) and FIG. 4B (an X-X sectional view of FIG. 4A). The light beams S outputted from the light output ends of the respective light emitting cores 3A are generally evenly diverged through the generally fan-shaped flared portions of the first lens portions 31 provided at the light output ends due to the general fan shape. Further, the horizontal (lateral) divergence of the light beams S with respect to the traveling directions of the light beams S (see FIG. 4A) is suppressed by the refractive function of the first lens portions 31 attributable to the shape (arcuate plan shape) of the lens surfaces 31a of the first lens portions 31. Then, the light beams S reach the inner edge portions of the over-cladding layers 4 as each having a greater width corresponding to the width of the lens surface 31a. In turn, the vertical divergence of the light beams S with respect to the traveling directions of the light beams S (see FIG. 4B) is suppressed by the refractive function of the second lens portions 42 (provided on the inner edge portions of the over-cladding layers 4) attributable to the shape (arcuate side sectional shape) of the lens surfaces 42a of the second lens portions 42. Then, the light beams S are outputted from the lens surfaces 42a of the second lens portions 42 (see FIG. 3). That is, the light beams S are outputted from the lens surfaces 42a of the second lens portions 42 on the light emitting side in such a state that the lateral divergence and the vertical divergence of the light beams S with respect to the traveling directions of the light beams S are suppressed by the refractive functions of the two types of lens portions (the first lens portions 31 and the second lens portions 42). Then, the light beams S travel in the hollow spaces of the rectangular frame-shaped optical waveguide members V.

Figure 4B:
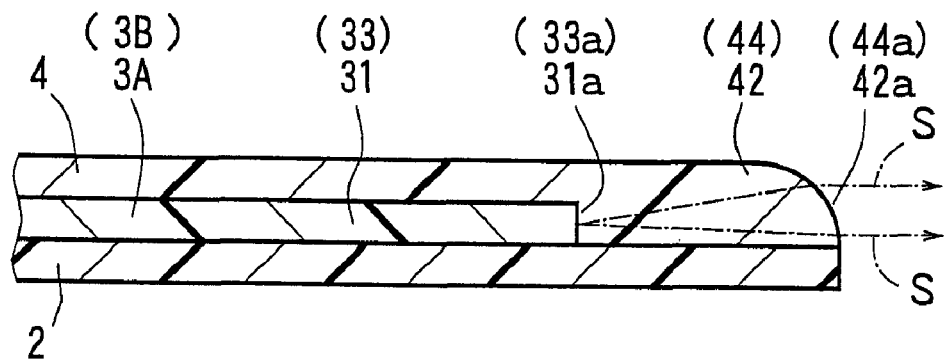

On the other hand, the light beams S having traveled in the hollow spaces of the rectangular frame-shaped optical waveguide members V are inputted into the light receiving optical waveguide portions B of the optical waveguide members V in a manner opposite from that described with reference to FIGS. 4A and 4B. That is, the light beams S are inputted into the lens surfaces 44a of the fourth lens portions 44 on the inner edge portions of the over-cladding layers 4, and vertically converged with respect to the traveling directions of the light beams S due to the refractive function of the fourth lens portions 44 attributable to the shape (arcuate side sectional shape) of the lens surfaces 44a of the fourth lens portions 44. Then, the light beams S are efficiently inputted into the third lens portions 33 through the lens surfaces 33a each having a greater width due to the general fan shape of the third lens portions 33 provided at the light input ends of the light receiving cores 3B. In turn, the light beams S are laterally converged with respect to the traveling directions of the light beams S due to the refractive function of the third lens portions 33 attributable to the shape (arcuate plan shape) of the lens surfaces 33a of the third lens portions 33. That is, the light beams S are transmitted inward through the light receiving cores 3B on the light receiving side in such a state that the light beams S are vertically and laterally converged with respect to the traveling directions of the light beams S due to the refractive functions of the two types of lens portions (the fourth lens portions 44 and the third lens portions 33). Then, as shown in FIG. 3, the light beams S are transmitted through the light receiving cores 3B in the light receiving optical waveguide portions B of the optical waveguide members V to the predetermined portions b on the outer edges, and received by the light receiving elements 6. The light receiving elements 6 convert received optical information into signals, which are transmitted to the control means 7.

Figure 5:
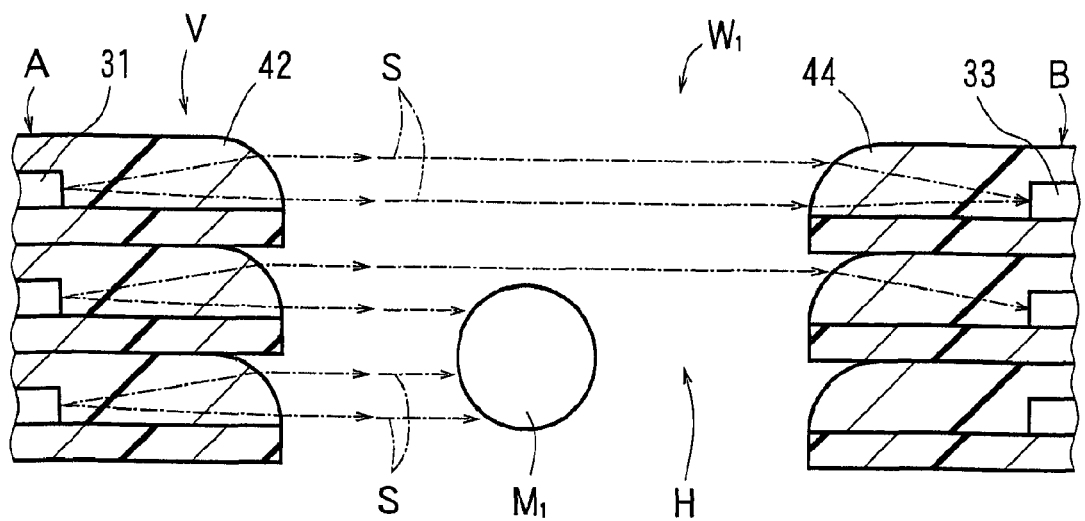
FIG. 5 is an explanatory diagram schematically showing how to detect an object by the three-dimensional sensor.

When an object $M_1$ to be detected is placed or moved in the continuous hollow spaces of the rectangular frame-shaped optical waveguide members V (the measurement space H of the three-dimensional sensor optical waveguide $W_1$), as shown in FIG. 5, the object $M_1$ blocks some of the light beams S in the measurement space H. Therefore, the blocking of the light beams is detected by the light receiving elements 6 (see FIG. 3). Then, the control means 7 (see FIG. 3) processes signals outputted from the light receiving elements 6 together with light emitting signals applied to the light emitting elements (see FIG. 3) through computation, thereby providing information such as the three-dimensional position, the inclination, the speed and the size of the object $M_1$ in the measurement space H.

Figure 6:
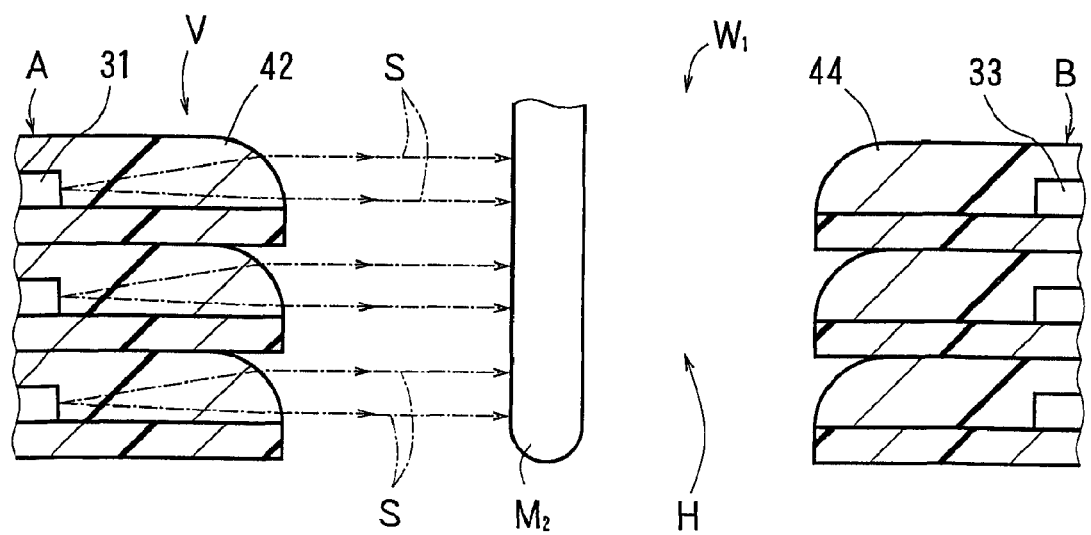
FIG. 6 is an explanatory diagram schematically illustrating the three-dimensional sensor, which is used as detection means for detecting a finger touch position on a touch panel.

Since the size reduction of the three-dimensional sensor can be achieved by employing the optical waveguide (optical waveguide members V), the three-dimensional sensor can be used, for example, as detection means for detecting a finger touch position on a touch panel. In this case, the rectangular frame-shaped three-dimensional sensor optical waveguide $W_1$ is placed along peripheral edges of a rectangular display screen of the touch panel as surrounding the display screen. When the display screen is touched by a finger, as shown in FIG. 6, a tip of the finger (an object to be detected) $M_2$ is moved from an upper opening end to a lower opening end of the measurement space H of the three-dimensional sensor optical waveguide $W_1$. Since the finger $M_2$ has a certain length, some of the outputted light beams S are blocked by the finger $M_2$ in all the optical waveguide members V of the three-dimensional sensor optical waveguide $W_1$. In this case, the three-dimensional sensor judges that an object touching the display screen is the finger $M_2$, and an operation specified by an operation item displayed at the finger touch position is permitted. On the other hand, dust, a water droplet or the like is present on the display screen, as shown in FIG. 5, some of the outputted light beams S are blocked by the dust, the water droplet or the like (corresponding to the object $M_1$ in FIG. 5) in lower ones of the optical waveguide members V of the three-dimensional sensor optical waveguide $W_1$. In this case, the three-dimensional sensor does not judge that the finger $M_2$ (see FIG. 6) touches the display screen, and prohibits the operation. This prevents an erroneous operation due to the dust, the water droplet or the like.

Particularly, the first and second lens portions 31, 42 are provided on the light emitting side in this embodiment. Therefore, the light beams S are outputted in a lattice pattern in the measurement space H of the three-dimensional sensor optical waveguide $W_1$, while the lateral divergence and the vertical divergence of the light beams S with respect to the traveling directions are suppressed. This improves the accuracy of the information on the object $M_1$.

In this embodiment, the third and fourth lens portions 33, 44 for the divergence of the light beams S are provided on the light receiving side. Therefore, the light transmission efficiency can be improved even if the light beams S are not converged at the first and second lens portions 31, 42 on the light emitting side when being outputted. This improves the accuracy of the information on the object $M_1$.

Next, an exemplary method of producing the three-dimensional sensor optical waveguide $W_1$ to be employed for the three-dimensional sensor will be described. FIGS. 7A to 7D and FIGS. 8A to 8D to be referred to for the description of the production method illustrate the portions around the first to fourth lens portions 31, 42, 33, 44 shown in FIGS. 2A to 2C. Since the lens portions provided on the light emitting side respectively have the same configurations as the lens portions provided on the light receiving side, these lens portions will be collectively described.

First, a planar base 1 (see FIG. 7A) to be used for producing optical waveguide members V of the three-dimensional sensor optical waveguide $W_1$ is prepared. Exemplary materials for the base 1 include glass, quartz, silicon, resins and metals. The base 1 has a thickness of, for example, 20 μm to 5 mm.

Figure 7A:
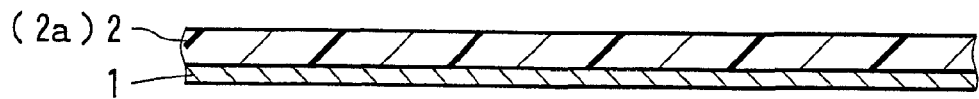
FIGS. 7A to 7D are explanatory diagrams schematically showing a method of producing the three-dimensional sensor optical waveguide.

In turn, as shown in FIG. 7A, a varnish prepared by dissolving a photosensitive resin as a material for an under-cladding layer 2 in a solvent is applied on a predetermined region of the base 1. Examples of the photosensitive resin include photosensitive epoxy resins. The application of the varnish is achieved, for example, by a spin coating method, a dipping method, a casting method, an injection method, an ink jet method or the like. Then, the resulting coating layer is dried by a heat treatment at 50° C. to 120° C. for 10 to 30 minutes. Thus, a photosensitive resin layer 2*a* for the formation of the under-cladding layer 2 is formed.

Subsequently, the photosensitive resin layer 2*a* is exposed to radiation. Examples of the radiation for the exposure include visible light, ultraviolet radiation, infrared radiation, X-rays, α-rays, β-rays and γ-rays. Preferably, the ultraviolet radiation is used. The use of the ultraviolet radiation permits irradiation at a higher energy to provide a higher curing speed. In addition, a less expensive smaller-size irradiation apparatus can be employed, thereby reducing production costs. Examples of a light source for the ultraviolet radiation include a low-pressure mercury-vapor lamp, a high-pressure mercury-vapor lamp and an ultra-high-pressure mercury-vapor lamp. The dose of the ultraviolet radiation is typically 10 to 10000 mJ/cm².

After the exposure, a heat treatment is performed for completion of a photoreaction. The heat treatment is typically performed at 80° C. to 250° C. for 10 seconds to 2 hours. Thus, the photosensitive resin layer 2*a* is formed into the under-cladding layer 2. The under-cladding layer 2 (photosensitive resin layer 2*a*) typically has a thickness of 1 to 50 μm.

Figure 7B:
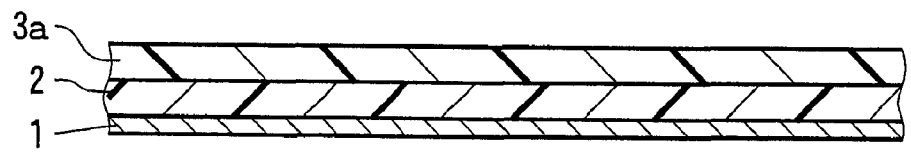

Then, as shown in FIG. 7B, a photosensitive resin layer 3*a* for formation of cores 3A, 3B is formed on a surface of the under-cladding layer 2. The formation of the photosensitive resin layer 3*a* is achieved in substantially the same manner as the formation of the photosensitive resin layer 2*a* for the formation of the under-cladding layer 2 described with reference to FIG. 7A. A material for the cores 3A, 3B has a higher refractive index than the material for the under-cladding layer 2 and a material for an over-cladding layer 4 (see FIG. 2C) to be described later. The refractive index may be adjusted, for example, by selection of the types of the materials for the under-cladding layer 2, the cores 3A, 3B and the over-cladding layer 4 and adjustment of the composition ratio.

Subsequently, an exposure mask formed with an opening pattern conformal to a pattern of the cores 3A, 3B (including first and third lens portions 31, 33) is placed above the photosensitive resin layer 3*a*, and the photosensitive resin layer 3*a* is exposed to radiation via the exposure mask. Then, a heat treatment is performed. The exposure and the heat treatment are carried out in the same manner as in the formation of the under-cladding layer 2 described with reference to FIG. 7A.

Figure 7C:
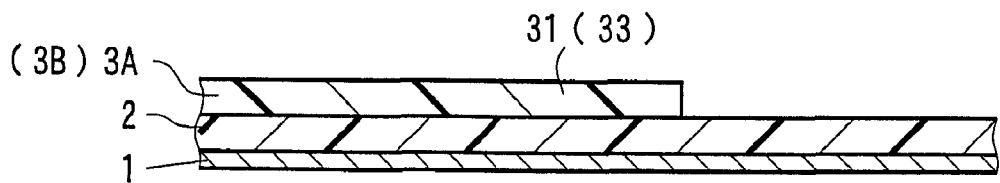

In turn, a development process is performed with the use of a developing solution, whereby an unexposed portion of the photosensitive resin layer 3a (see FIG. 7B) is dissolved away as shown in FIG. 7C. Thus, the pattern of the cores 3A, 3B is formed, which is defined by portions of the photosensitive resin layer 3a remaining on the under-cladding layer 2. Exemplary methods for the development process include an immersion method, a spray method and a puddle method. Examples of the developing solution include organic solvents, and organic solvents containing alkali aqueous solutions. The developing solution and conditions for the development are properly selected depending on the photosensitive resin composition.

After the development, the developing solution in surfaces of the remaining portions of the photosensitive resin layer 3a having the pattern of the cores 3A, 3B is removed by a heat treatment. The heat treatment is typically performed at 80° C. to 120° C. for 10 seconds to 30 minutes. Thus, the remaining portions of the photosensitive resin layer 3a having the core pattern serve as the cores 3A, 3B (including the first and third lens portions 31, 33). The cores 3A, 3B (photosensitive resin layer 3a) typically each have a thickness of 10 to 100 μm, and a width of 8 to 50 μm (except for the generally fan-shaped flared portions of the first and third lens portions 31, 33). The generally fan-shaped flared portions of the first and third lens portions 31, 33 typically each have a center angle (taper angle) of 5 to 50 degrees. The lens surfaces 31a, 33a of the first and third lens portions 31, 33 each have a curvature radius greater than 50 μm and less than 6000 μm.

Figure 7D:
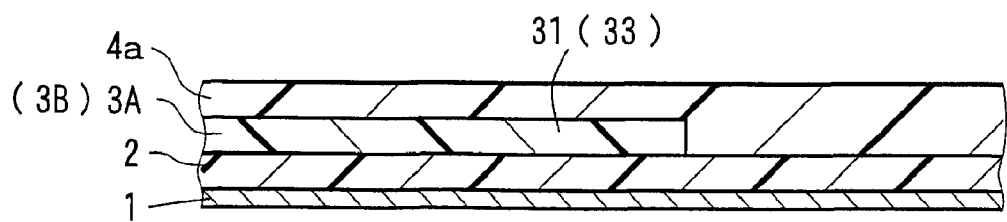

Then, as shown in FIG. 7D, a photosensitive resin for an over-cladding layer 4 is applied on a surface of the under-cladding layer 2 as covering the cores 3A, 3B to form a photosensitive resin layer 4a (in an uncured state). Examples of the photosensitive resin for the over-cladding layer 4 include those described for the under-cladding layer 2.

Figure 8A:
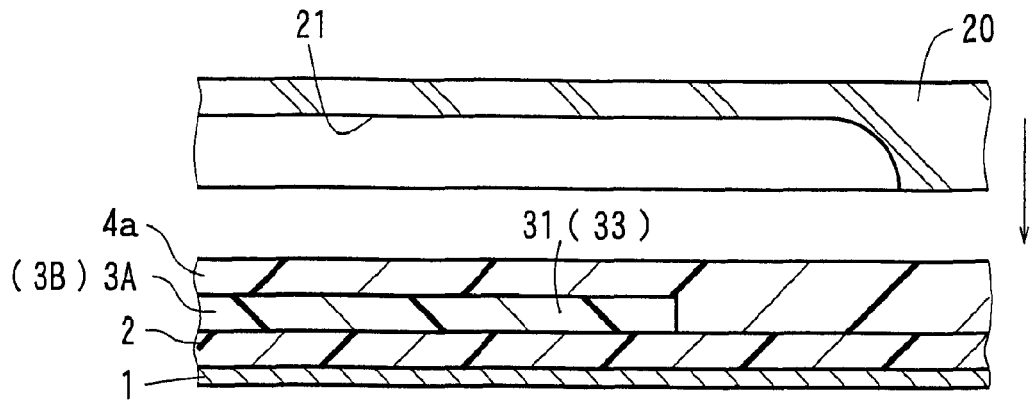
FIGS. 8A to 8D are explanatory diagrams schematically showing subsequent steps of the three-dimensional sensor optical waveguide producing method.
Figure 8B:
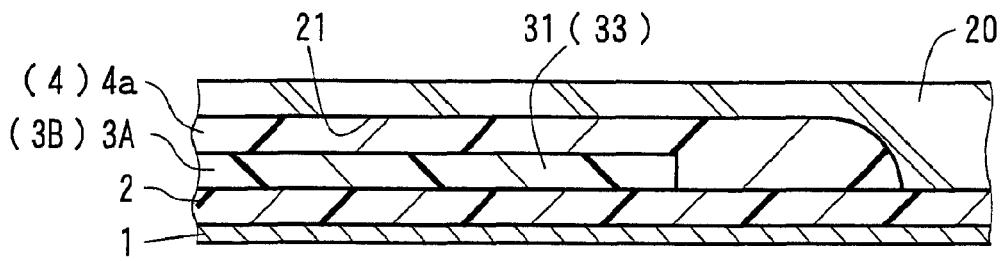
Figure 8C:
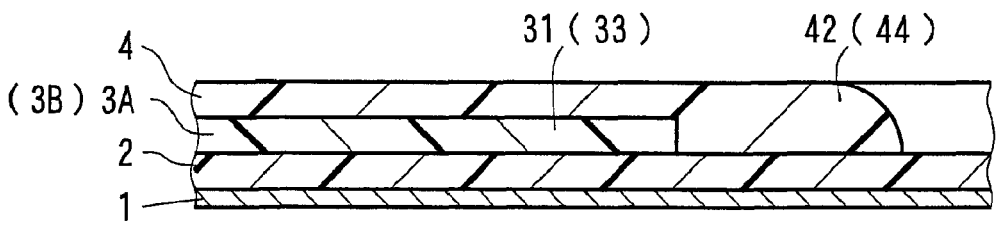

Subsequently, as shown in FIG. 8A, a molding die 20 for imparting the over-cladding layer 4 with a rectangular frame shape by press-molding is prepared. The molding die 20 is composed of a material (e.g., quartz) transmissive to radiation such as ultraviolet radiation, and has a recess having a molding surface 21 conformal to the surface geometry of the over-cladding layer 4 including the second and fourth lens portions 42, 44. Then, as shown in FIG. 8B, the molding die 20 is pressed against the photosensitive resin layer 4a so that the molding surface (recess) 21 of the molding die 20 is placed in a predetermined positional relationship with respect to the cores 3A, 3B. Thus, the photosensitive resin layer 4a is imparted with the shape of the over-cladding layer 4. In this state, the photosensitive resin layer 4a is exposed to radiation such as ultraviolet radiation through the molding die 20, and then heat-treated. The exposure and the heat treatment are performed in the same manner as in the formation of the under-cladding layer 2 described with reference to FIG. 7A. Thereafter, as shown in FIG. 8C, the resulting product is demolded. Thus, the rectangular frame-shaped over-cladding layer 4 is formed as having the second and fourth lens portions 42, 44. The over-cladding layer 4 typically has a height of 50 to 2000 μm. A distance between the curvature center of the lens surface 31a of each of the first lens portions 31 and the curvature center of the lens surface 42a of the second lens portion 42 and a distance between the curvature center of the lens surface 33a of each of the third lens portions 33 and the curvature center of the lens surface 44a of the fourth lens portion 44 are greater than 400 μm and less than 10000 μm.

The lens surfaces 42a, 44a of the second and fourth lens portions 42, 44 each have a curvature radius greater than 300 μm and less than 10000 μm.

The second and fourth lens portions 42, 44 are thus formed as extensions of the over-cladding layer 4. Therefore, the first and third lens portions 31, 33 at the ends of the cores 3A, 3B are properly positioned with respect to the second and fourth lens portions 42, 44 as the extensions of the over-cladding layer 4 upon the formation of the over-cladding layer 4. Where the under-cladding layer 2 and the over-cladding layer 4 are composed of the same material, the under-cladding layer 2 and the over-cladding layer 4 are assimilated with each other at their interface.

Figure 8D:
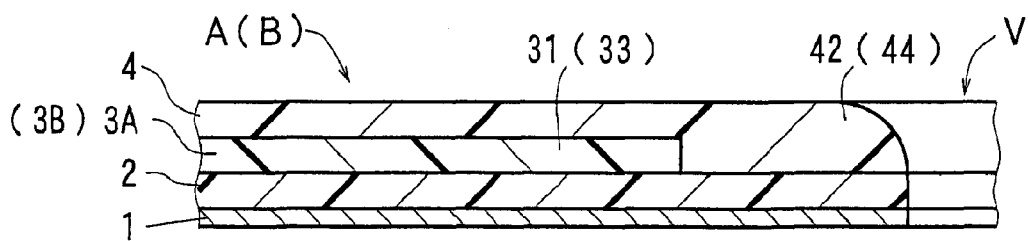

Thereafter, as shown in FIG. 8D, the base 1 and the under-cladding layer 2 are cut into a rectangular frame shape by stamping with the use of a blade die. Thus, the rectangular frame-shaped optical waveguide member V including the under-cladding layer 2, the cores 3A, 3B and the over-cladding layer 4 (including the second and fourth lens portions 42, 44) is produced on the surface of the base 1. The optical waveguide member V typically has a thickness of 500 to 5000 μm. Thereafter, the optical waveguide member V is separated from the base 1 (see FIG. 2C).

Then, as shown in FIG. 1, a plurality of such optical waveguide members V are stacked coaxially in a thickness direction. In this embodiment, the optical waveguide members V are stacked in alignment. When the frame-shaped optical waveguide members V are stacked one on another, an adhesive is applied to lower surfaces of overlying frame-shaped optical waveguide members V or upper surfaces of underlying frame-shaped optical waveguide members V. In this manner, the three-dimensional sensor optical waveguide $W_1$ is produced.

Next, a method of producing a three-dimensional sensor by employing the aforementioned three-dimensional sensor optical waveguide $W_1$ will be described. That is, as shown in FIG. 3, light emitting elements 5 are respectively connected to the predetermined portions a on the outer edges of the light emitting optical waveguide portions A of the rectangular frame-shaped optical waveguide members V, and light receiving elements 6 are respectively connected to the predetermined portions b on the outer edges of the light receiving optical waveguide portions B of the rectangular frame-shaped optical waveguide members V. The light emitting elements 5 and the light receiving elements 6 are electrically connected to the control means 7. In this manner, the aforementioned three-dimensional sensor is produced.

Figure 9:
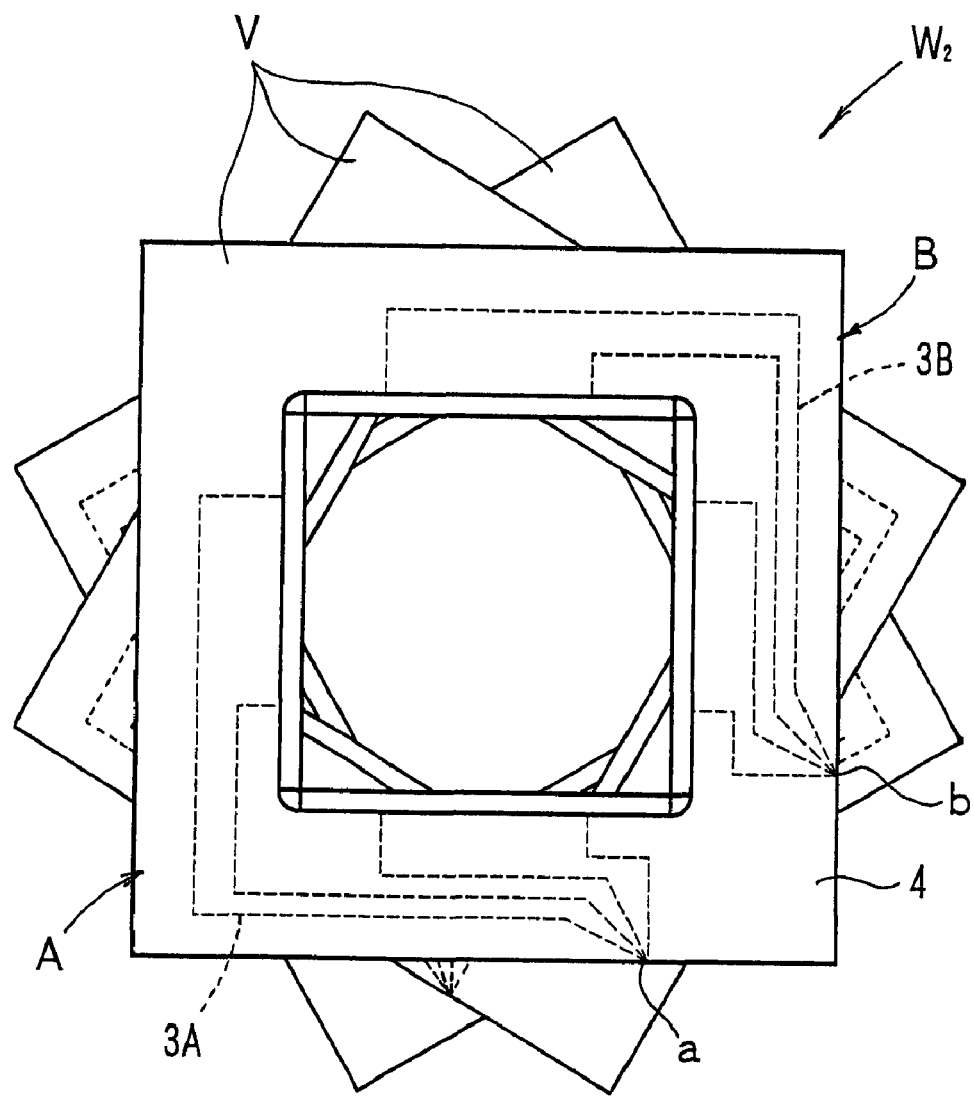
FIG. 9 is a plan view schematically illustrating a three-dimensional sensor optical waveguide according to a second embodiment of the present invention.

FIG. 9 is a plan view illustrating a three-dimensional sensor optical waveguide according to a second embodiment of the present invention. The three-dimensional sensor optical waveguide $W_2$ according to this embodiment has substantially the same construction as the three-dimensional sensor optical waveguide $W_1$ (see FIG. 1) according to the first embodiment, except that the stacked frame-shaped optical waveguide members V are offset about a predetermined axis from each other. Therefore, like components will be denoted by like reference characters.

In the three-dimensional sensor employing the three-dimensional sensor optical waveguide $W_2$ according to this embodiment, the optical waveguide members V emit light in different directions at different stack positions (height positions). Therefore, an object can be detected at different angles at different heights. Thus, the approximate shape of the object can be detected.

In the embodiments described above, the three-dimensional sensor optical waveguides $W_1$, $W_2$ each have a reduced size. The three-dimensional sensor optical waveguides $W_1$, $W_2$ each have no upper limit in size, as long as proper light transmission from the light emitting side to the light receiving side is ensured. The sizes of the three-dimensional sensor optical waveguides $W_1$, $W_2$ may be properly determined according to the size of the object $M_1$ to be detected and the movement range of the object $M_1$. Where the three-dimensional sensor optical waveguide $W_1$ is mounted on a touch panel display as in the first embodiment, for example, the rectangular frame-shaped optical waveguide members V each have a vertical or horizontal length of about 30 to about 300 mm, and a frame width of about 1 to about 30 mm. The number of the optical waveguide members V to be stacked is two or greater, and the overall thickness of the three-dimensional sensor optical waveguide $W_1$ is not less than 1 mm.

The number of the light emitting cores 3A (the number of the light receiving cores 3B) may be properly determined according to the size of the object $M_1$ and the movement range of the object $M_1$. Where the three-dimensional sensor optical waveguide $W_1$ is mounted on the touch panel display as in the first embodiment, the number of the light emitting cores 3A in each of the optical waveguide members is about 20 to about 100.

In the embodiments described above, the optical waveguide members V are vertically stacked in contact with one another. Alternatively, the optical waveguide members V may be stacked in spaced relation with the intervention of spacers. Distances between the optical waveguide members V may be properly determined according to the size of the object $M_1$ and the movement range of the object $M_1$.

In the embodiments described above, the optical waveguide members V each have a rectangular frame-shape. The rectangular frame-shaped optical waveguide members V may each include two separate L-shaped optical waveguide portions A, B. In production of such an optical waveguide member V, the unfinished product may be cut into two L-shaped portions, rather than into the rectangular frame shape. The optical waveguide members V may each have any other polygonal shape or a round shape, rather than a rectangular shape.

In the embodiments described above, the first and third lens portions 31, 33 at the ends of the cores 3A, 3B each have a general fan shape. As long as proper light transmission from the light emitting side to the light receiving side is ensured in the three-dimensional sensor, the first and third lens portions 31, 33 may each have a uniform width.

On the light receiving side, the light input end faces of the light receiving cores 3B may be exposed on inner side faces of the over-cladding layer 4 without the provision of the third and fourth lens portions 33, 44 (see FIGS. 2A to 2C). In this case, the light beams are preferably outputted in a converged state from the first and second lens portions 31, 42 on the light emitting side, so that the light beams can be inputted in a converged state on the light input end faces of the light receiving cores 3B for improvement of the light transmission efficiency. Conversely, the third and fourth lens portions 33, 44 may be provided on the light receiving side without the provision of the first and second lens portions 31, 42 on the light emitting side. In this case, the light output end faces of the light emitting cores 3A are exposed on inner side faces of the over-cladding layer 4.

As long as proper light transmission from the light emitting side to the light receiving side is ensured in the three-dimensional sensor, the first to fourth lens portions 31, 42, 33, 44 may be obviated. In this case, the light output end faces of the light emitting cores 3A and the light input end faces of the light receiving cores 3B are exposed on the inner side faces of the over-cladding layer 4.

In the embodiments described above, the under-cladding layer 2 is formed of the photosensitive resin. Alternatively, a resin film having the function of the under-cladding layer 2 may be prepared to be used as it is as the under-cladding layer 2. Instead of the under-cladding layer 2, a substrate having a metal film (metal material) or a thin metal film (metal material) formed on its surface may be used as a base on which the cores 3A, 3B are formed.

In the embodiments described above, the optical waveguide members V are stacked one on another after being respectively separated from the bases 1. Alternatively, the optical waveguide members V each formed on the base 1 may be stacked one on another without separation.

Next, an inventive example will be described. However, the present invention is not limited to the example.

Example

Under-Cladding Layer Material and Over-Cladding Layer Material

An under-cladding layer material and an over-cladding layer material were prepared by mixing 35 parts by weight of bisphenoxyethanolfluorene glycidyl ether (Component A) represented by the following general formula (1), 40 parts by weight of 3',4'-epoxycyclohexyl methyl 3,4-epoxycyclohexanecarboxylate (an alicyclic epoxy resin CELLOXIDE 2021P manufactured by Daicel Chemical Industries, Ltd.) (Component B), 25 parts by weight of (3',4'-epoxycyclohexane)methyl 3',4'-epoxycyclohexyl carboxylate (CELLOXIDE 2081 manufactured by Daicel Chemical Industries, Ltd.) (Component C), and 2 parts by weight of a 50% propione carbonate solution of 4,4'-bis[di(β-hydroxyethoxy)phenylsulfinio]phenylsulfide bishexafluoroantimonate (Component D).

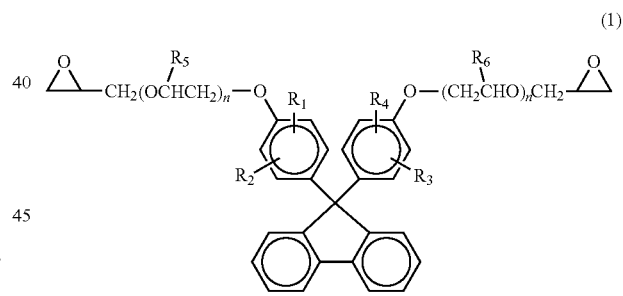

wherein $R_1$ to $R_6$ are hydrogen atoms, and n=1.

Core Material

A core material was prepared by dissolving 70 parts by weight of Component A, 30 parts by weight of 1,3,3-tris{4-[2-(3-oxetanyl)]butoxyphenyl}butane and 1 part by weight of Component D in 28 parts by weight of ethyl lactate.

Production of Three-Dimensional Sensor Optical Waveguide

The under-cladding layer material was applied onto a surface of a polyethylene naphthalate (PEN) film (160 mm×160 mm×188 μm (thickness)) by means of an applicator, and then exposed to ultraviolet radiation at 2000 mJ/cm². In turn, a heat treatment was performed at 100° C. for 15 minutes. Thus, an under-cladding layer was formed. The under-cladding layer had a thickness of 20 μm as measured by a contact film thickness meter. Further, the under-cladding layer had a refractive index of 1.502 at a wavelength of 830 nm.

Then, the core material was applied onto a surface of the under-cladding layer by means of an applicator, and dried at 100° C. for 15 minutes. In turn, a synthetic quartz-based chromium mask (exposure mask) formed with an opening pattern conformal to a core pattern (including first and third lens portions) was placed above the resulting core material film. After the core material film was exposed to ultraviolet radiation emitted from above at 4000 mJ/cm² via the mask by a contact exposure method, a heat treatment was performed at 80° C. for 15 minutes. Subsequently, a development process was performed by using a γ-butyrolactone aqueous solution to dissolve away an unexposed portion, and then a heat treatment was performed at 120° C. for 30 minutes. Thus, cores were formed. The first and third lens portions provided at core ends each had a general fan shape having a center angle of 7 degrees and a length of 2460 μm, and lens surfaces of the first and third lens portions each had a curvature radius of 160 μm. The cores each had a thickness of 50 μm and a width of 15 μm (except for generally fan-shaped flared portions of the first and third lens portions) as measured by means of a SEM (scanning electron microscope). The cores each had a refractive index of 1.588 at a wavelength of 830 nm.

Then, the over-cladding layer material was applied on a surface of the under-cladding layer as covering the cores by means of an applicator. In turn, a quartz molding die having portions conformal to the curvatures (each having a radius of 1500 μm) of lens surfaces of second and fourth lens portions was prepared for formation of an over-cladding layer. The molding die had a recess having a molding surface conformal to the surface geometry of the over-cladding layer (including the second and fourth lens portions). Then, the molding die was pressed against the over-cladding layer material with the curvature centers of the lens surfaces of the first lens portions and the curvature centers of the lens surfaces of the third lens portions being spaced a distance of 2800 μm from the curvature center of the lens surface of the second lens portion and the curvature center of the lens surface of the fourth lens portion, respectively. In turn, the over-cladding layer material was exposed to ultraviolet radiation at 2000 mJ/cm² through the molding die, and then heat-treated at 120° C. for 15 minutes. Thereafter, the resulting product is demolded. Thus, the over-cladding layer including the second and fourth lens portions were formed. The over-cladding layer had a height of 1.5 mm as measured by a microscope (available from Keyence Corporation). Further, the over-cladding layer had a refractive index of 1.502 at a wavelength of 830 nm.

The resulting product was cut together with the PEN film into two L-shaped optical waveguide portions by stamping with the use of a blade die. Thus, the two L-shaped optical waveguide portions including the PEN film (having an outer size of 66.3 mm×70.0 mm, and an L-shaped line width of 10 mm) were provided (a rectangular frame-shaped optical waveguide member including the PEN film was provided).

The two L-shaped optical waveguide portions each including the PEN film were placed in opposed relation in a rectangular frame shape on a surface of a glass epoxy substrate, and then positioned so as to align optical axes of light emitting cores with optical axes of corresponding light receiving cores with the use of a microscope. Three pairs of such L-shaped optical waveguide portions each including the PEN film were stacked one on another in the aforementioned manner with the intervention of an adhesive. In this state, the resulting stack was fixed onto a surface of a glass epoxy substrate with the use of a UV-curable adhesive. The PEN film of the lowermost optical waveguide member was in contact with the glass epoxy substrate. Thus, the three-dimensional sensor optical waveguide including the three optical waveguide members was produced.

Production of Three-Dimensional Sensor

Light emitting elements (VCSELs) were respectively connected to predetermined portions on outer edges of L-shaped light emitting optical waveguide portions of the optical waveguide members of the three-dimensional sensor optical waveguide, and light receiving elements (CMOS linear sensor arrays) were respectively connected to predetermined portions on outer edges of L-shaped light receiving optical waveguide portions of the optical waveguide members. Further, the light emitting elements and the light receiving elements were electrically connected to a microprocessor. Thus, a three-dimensional sensor was produced.

EVALUATION

The light emitting elements were caused to emit light at an intensity of 1.5 mW (at a wavelength of 850 nm), and it was confirmed that the light receiving elements were capable of detecting light. When a finger tip was inserted from an upper opening end of a measurement space of the three-dimensional sensor optical waveguide including the three optical waveguide members to reach the surface of the glass epoxy substrate, the emitted light was partly blocked in all the three optical waveguide members. When a water droplet was dropped on the surface of the glass epoxy substrate, the emitted light was partly blocked in the lowermost optical waveguide member. Further, when a polystyrene foam piece (having a diameter of 3 mm) was placed on the surface of the glass epoxy substrate, the emitted light was partly blocked in the two lowermost optical waveguide members.

The aforementioned results indicate that, where the aforementioned three-dimensional sensor is used as detection means for detecting a finger touch position on a touch panel, the three-dimensional sensor is capable of judging whether or not the finger touches the touch panel, and preventing an erroneous operation which may otherwise occur due to the presence of a water droplet or dust (polystyrene foam piece).

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A three-dimensional sensor optical waveguide comprising:
   a plurality of frame-shaped optical waveguide members stacked coaxially in a thickness direction; and
   a measurement space defined by inner spaces of the stacked frame-shaped optical waveguide members;
   the optical waveguide members each including a light emitting core, a light receiving core and an over-cladding layer covering the cores;
   the light emitting core having a light output end positioned in one of opposed inner edge portions of each of the frame-shaped optical waveguide members, and a light input end positioned on an outer edge of each of the frame-shaped optical waveguide members;
   the light receiving core having a light input end positioned in the other inner edge portion of each of the frame-shaped optical waveguide members, and a light output end positioned on another outer edge of each of the frame-shaped optical waveguide members, wherein the light emitting core of each of the optical waveguide members includes a first lens portion provided at the light output end thereof and having a lens surface curved convexly outward into an arcuate plan shape, wherein the over-cladding layer of each of the optical waveguide members includes a second lens portion provided on an edge portion thereof which covers the lens surface of the first lens portion and has a lens surface curved convexly outward into an arcuate shape as seen in side section.

2. A three-dimensional sensor optical waveguide as set forth in claim 1, wherein the light receiving core of each of the optical waveguide members includes a third lens portion provided at the light input end thereof and having a lens surface curved convexly outward into an arcuate plan shape, wherein the over-cladding layer of each of the optical waveguide members includes a fourth lens portion provided on an edge portion thereof which covers the lens surface of the third lens portion and having a lens surface curved convexly outward into an arcuate shape as seen in side section.

3. A three-dimensional sensor optical waveguide as set forth in claim 1, the stacked frame-shaped optical waveguide members are offset about a predetermined axis from each other.

4. A three-dimensional sensor optical waveguide as set forth in claim 1, wherein the cores are provided on a predetermined portion of a surface of a substrate composed of an under-cladding material or a metal material, and the over-cladding layer is provided on the surface of the substrate as covering the cores.

5. A three-dimensional sensor comprising:

a three-dimensional sensor optical waveguide as recited in claim 1;

control means;

a light emitting element provided in association with the light input end of the light emitting core on an outer side of the frame-shaped optical waveguide members for emitting light into the light emitting core; and a light receiving element provided in association with the light output end of the light receiving core on the outer side of the frame-shaped optical waveguide members for receiving light from the light receiving core;

the control means being electrically connected to the light emitting element and the light receiving element, and configured to control light emission from the light emitting element and process a signal received from the light receiving element through computation.

* * * * *